(12) United States Patent
Silverman

(10) Patent No.: US 6,252,869 B1
(45) Date of Patent: Jun. 26, 2001

(54) DATA NETWORK SECURITY SYSTEM AND METHOD

(75) Inventor: David P. Silverman, Somerville, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/580,671

(22) Filed: Dec. 29, 1995

(51) Int. Cl.⁷ ............................................. H04L 12/64
(52) U.S. Cl. ............................................... 370/352
(58) Field of Search ....................... 379/90.01, 93.01, 379/93.02, 93.03, 93.05, 93.06, 93.07, 93.09, 93.1, 93.12, 93.15, 121, 130, 114; 370/352, 353, 354, 355, 356; 348/12, 13; 455/31.3

(56) References Cited

U.S. PATENT DOCUMENTS

| | | | |
|---|---|---|---|
| 4,996,685 | | 2/1991 | Farese et al. ............. 370/58.1 |
| 5,003,584 | * | 3/1991 | Benyacar et al. .......... 379/121 |
| 5,148,474 | * | 9/1992 | Haralambopoulos et al. ... 379/130 |
| 5,151,782 | * | 9/1992 | Ferraro ................. 379/93.12 |
| 5,187,710 | * | 2/1993 | Chau et al. ............. 379/114 |
| 5,396,537 | * | 3/1995 | Schwendeman ............ 455/31.3 |
| 5,504,933 | * | 4/1996 | Saito .................... 348/12 |
| 5,625,677 | * | 4/1997 | Friertag et al. ......... 370/352 |
| 5,642,155 | * | 6/1997 | Cheng .................... 348/13 |
| 5,680,399 | * | 10/1997 | Totzke et al. ........... 348/13 |
| 5,712,907 | * | 1/1998 | Wegner et al. . | |
| 5,726,984 | * | 3/1998 | Fubler et al. . | |
| 5,838,682 | * | 11/1998 | Dekelbaum et al. ........ 370/401 |
| 5,995,606 | * | 11/1999 | Civanlar et al. ......... 370/352 |

FOREIGN PATENT DOCUMENTS

| | | | |
|---|---|---|---|
| 0 701 349 A1 | 3/1996 | (EP) | H04L/12/56 |
| 2283154A | 4/1995 | (GB) | H04Q/11/04 |

* cited by examiner

Primary Examiner—Huy D. Vu

(57) ABSTRACT

A secure communication mechanism for communicating credit card or other sensitive information between a user terminal and a server which communicate over a data network (e.g., Internet). For secure or private communication of sensitive information over a data network, a telephone connection is established between the originating server to which the user is connected for access to the data network and the SP to which the sensitive information is directed. The method and system provide for a secure electronic commercial transaction between a user and a service provider which charges for information and/or services and/or goods, wherein sensitive information includes credit card information transmitted from the user to the service provider, and/or electronic information or services transmitted from the service provider to the user in exchange for payment received from the user.

36 Claims, 4 Drawing Sheets

DATA NETWORK SECURITY SYSTEM AND METHOD

TECHNICAL FIELD

This invention relates generally to secure communications over data networks, and particularly to a method for secure transactions for information, interactive services, and secure payment for other services and goods that may be purchased over data networks.

BACKGROUND OF THE INVENTION

Currently, a multitude of services are available to users over data networks such as the Internet. These services include information and interactive services deliverable over the network, and goods and services that may be shopped for and ordered over the network but are not deliverable over the network (e.g., clothing, food, etc.). Despite the plethora of available services and the apparent convenience for consumers of virtual shopping from electronic merchants or service providers (SPs), individuals are generally wary of electronic shopping and particularly, are reluctant to send credit card or other sensitive information over the Internet, since it is well publicized that personal credit card information should not be transmitted over a public data network, which may be subject to unauthorized access. It is also well publicized that individuals have cracked security coding mechanisms (e.g., RSA encryption) used in commercial software for secure communications on the Internet. It is therefore possible, for instance, that while en route to a targeted SP, encrypted credit card or other sensitive information may be intercepted at intervening routers by "hackers" or other eavesdroppers, who can decrypt the information.

Some providers of "non-electronically" delivered goods or services (e.g., goods delivered off-line; e.g., food, clothing, etc.) provide an option for avoiding sending sensitive information over the Internet by posting 800 telephone numbers that a user later calls off-line to pay for the goods or services which were ordered (but not paid for) over the Internet. This approach, however, is not only cumbersome, thus negating the appeal and purpose of virtual shopping and on-line purchasing of goods and services, but is also not suited as a payment method for goods and services (including information) which are delivered over the Internet (referred to hereinafter as "electronic goods"), and which are preferably delivered interactively in one session as part of a single transaction.

It may be understood that the lack of a secure transaction mechanism limits the further development of the Internet, the availability of service providers to users, and particularly the viability of smaller SPs. It is known that in addition to providing gateway access to the Internet and the thousands of small service providers around the world, large information service providers such as Prodigy, America Online and Compuserve provide their own information and interactive services. Users may also access the Internet and the thousands of smaller information service providers (ISPs) directly through smaller user-local Internet access providers. Generally, the large information service providers bill their customers on a time-usage basis after a financial payment relationship has been established, with the user/customer receiving a monthly bill which may include additional charges for usage of certain information and services and which is paid via the conventional postage system. Similarly, the smaller user-local Internet access providers usually also base their service charges to their subscribers for access to the Internet on a time-usage basis.

The smaller ISPs, however, currently either do not charge for access to their information and interactive services, or, if they do, also require the user to establish some sort of financial relationship whereby the user subscribes to the ISP and pays a bill via the conventional postage system. A frequent user of a particular established ISP may not be adverse to establishing a financial relationship for payment purposes. Typically, however, and in accordance with a fundamental concept of using the Internet (e.g., "surfing the net" using Web browsers which link websites by hypertext), a user accesses many different ISPs, each on only a casual and often unanticipated basis, and is not likely to want or be able to establish a plethora of financial relationships with so many different providers. ISPs that do or want to charge for access to their information and/or interactive services could do so by requiring the user to input their credit card number before data service is provided. Yet, as discussed above, users are loath to sending credit card information over the Internet, and therefore, would likely eschew such ISPs, who are typically smaller ISPs.

Accordingly, it may be appreciated that from the standpoint of the user/consumer, such a security and privacy risk effectively preempts the ostensible convenience of services available over data networks, and also limits the actual availability of information and interactive services to those which are free of charge or are charged within the purview of existing financial relationships (e.g., information from a user's service provider). From the standpoint of the SPs, the absence of a secure on-line billing mechanism limits the virtual marketplace, and its potential returns. In addition, the lack of a secure payment mechanism limits the number of SPs which can enter this marketplace, thereby limiting competition which would also likely benefit users/consumers.

There is a need, therefore, for improved secure communication methods over data networks, and particularly, for improved methods which provide enhanced security for users to send credit card or other sensitive information to Internet SPs.

SUMMARY OF THE INVENTION

The present invention overcomes the above, and other, prior art limitations by providing a secure communication mechanism which does not require credit card or other sensitive information to be transmitted over the data network (e.g., Internet) to a SP which charges for information and/or services and/or goods (including non-electronically delivered and electronically delivered goods). In accordance with the present invention, for secure or private communication of sensitive information over a data network, a telephone connection is established between the originating server to which the user is connected for access to the data network and the SP to which the sensitive information is directed.

In accordance with an embodiment of the invention, the telephone connection is established for user payment to an ISP for receiving from the ISP information and/or interactive services via the data network such as the Internet (i.e. electronically delivered goods or services) and/or for paying an ISP for non-electronically delivered goods or services ordered over the Internet. Users access a terminating ISP server from an originating access SP server as they usually do on a first connection over the Internet or any other data network via routing point servers, using a technology such as Web client/server technology. Any communications or transactions to a terminating ISP server involving credit card or other sensitive information are effected, however, on a second connection through a telephone call placed to a telephone number of the terminating ISP server. After receiving a call, and by associating such call with the user's request over the Internet for information and/or interactive services, and/or non-electronically deliverable goods or services, the ISP provides the user with the requested information and/or service, or approves delivery of the non-electronically deliverable goods or services. With the arrangement, payment is effected without providing credit card information via the Internet routing servers and without establishing a financial relationship with the ISP. Preferably, the communication of information over the telephone line between the originating server and the terminating ISP server is also subject to encryption.

In one embodiment of the invention when, based on actions of the user accessing the data network via an originating access SP server, if a terminating ISP requires credit card or sensitive information from the user, the terminating ISP) verifies that the originating access SP server supports the security mechanism. Upon verification from the originating access SP server, the terminating ISP server reserves a telephone number associated with the terminating ISP server, and transmits the telephone number over the data network to the originating access SP server. The originating access SP server then calls the terminating ISP server via the received telephone number to establish a telephone connection. Sensitive information is then communicated via the telephone connection, after which the telephone connection is terminated.

In another embodiment, the user may selectively invoke secure communications (e.g. by clicking on an icon on the user's terminal screen) to communicate to the user's originating access SP server (or, to the terminating ISP server) that a secure communication link over the telephone line should be established with the terminating ISP server (originating access SP server) for communicating sensitive information from the user to the terminating ISP. The originating access SP server (the terminating ISP) then verifies that the terminating ISP server (originating access SP server) supports the secure communication mechanism. Upon verification, a telephone connection is established between the originating access SP server and the terminating ISP server, and the sensitive information is communicated. The telephone connection is terminated in accordance with user commands or the transmitted information itself. In a further related embodiment, when a transaction of sensitive information is to occur but the user does not choose to invoke a secure telephone connection for sending credit card information but relies on conventional mechanisms, the terminating ISP server can initiate establishment of a secure telephone communication link with the originating access SP server in order to send electronic goods/services to the user.

In a similar embodiment, the user's originating access SP server initiates establishment of a secure telephone communication link with the terminating ISP server upon identifying a communication from the user that includes sensitive or private information.

BRIEF DESCRIPTION OF THE DRAWINGS

The invention will be described in greater detail below by way of reference to the accompanying drawings, wherein.

DETAILED DESCRIPTION OF THE INVENTION

Figure 1:
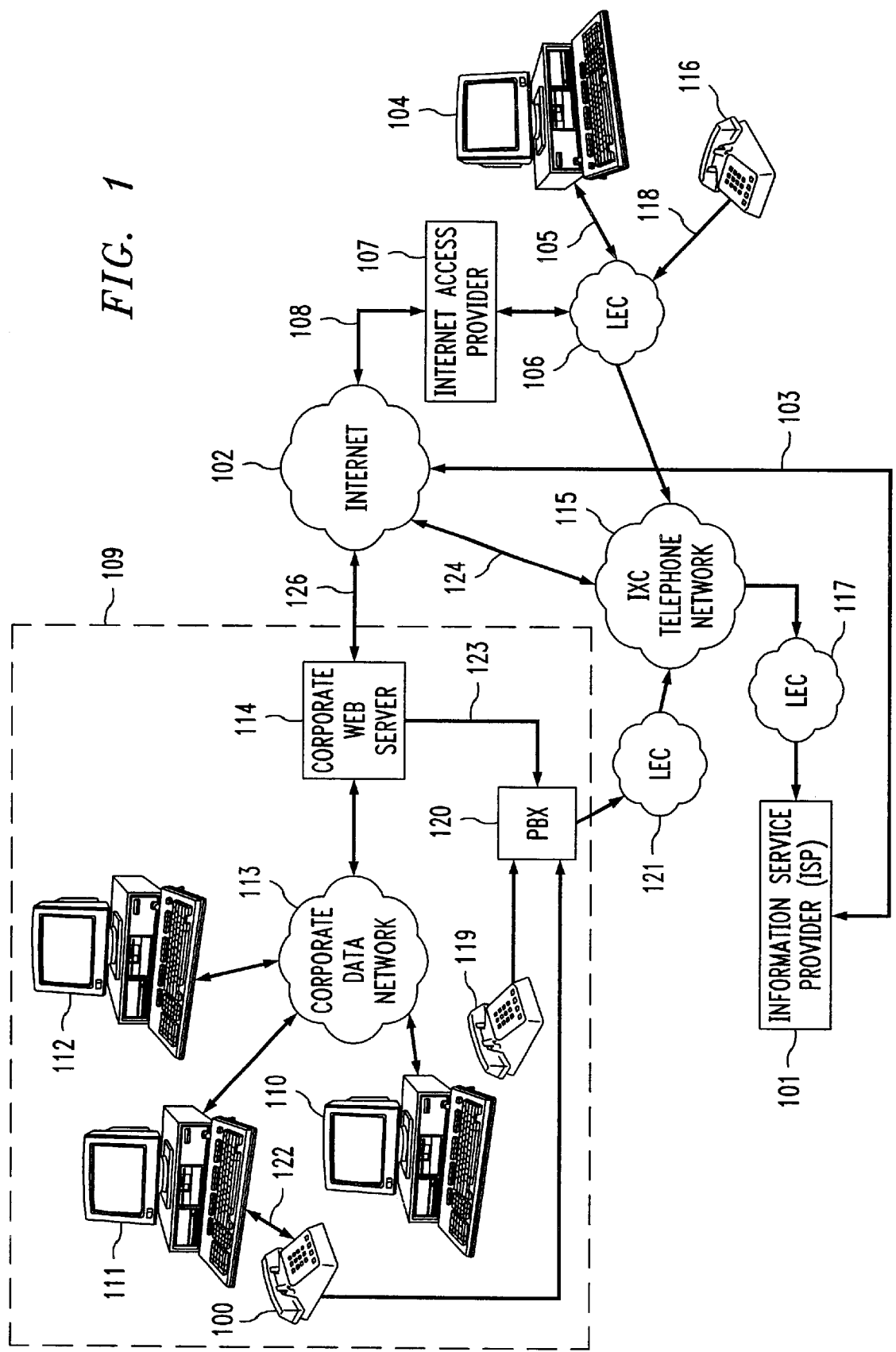
FIG. 1 illustrates a system in accordance with the present invention, which provides users access to information and/or services on a data network, such as the Internet, and provides for secure communication of sensitive information through a telephone network for transactions involving the information and/or services.

With reference to FIG. 1, a system is shown which provides access for users on a data network to information and/or interactive services, and for a secure communication mechanism on a telephone network for the provision of those services. For purposes of illustration and clarity of exposition, it will be assumed that the data network is the Internet, and that the secure communication involves providing user credit card information to a service provider (SP) as payment for providing information and/or interactive services, including electronically deliverable and/or non-electronically deliverable goods and services. It is understood, however, that the present invention is not limited to secure payment communications, or to payment for information and/or interactive services only on the Internet.

In FIG. 1, a single ISP 101 is shown connected to the Internet network 102. It should be appreciated, however, that a multitude of ISPs are connected to the Internet and are available for access to the multitude of users around the world having access to the Internet. It may also be appreciated that Internet network 102 schematically represents an interconnection of network nodes which include router and/or gateway servers, which may themselves include or be part of websites and/or ISPs. Similarly, ISP 101 may itself include Internet router and/or gateway servers. Connection between the ISP 101 and the Internet 102 is over T1 digital transmission facilities 103, or other high speed transmission lines. A user desiring access to the information and/or interactive services available over the Internet from ISP 101 may be an individual who accesses the Internet through his terminal 104. Terminal 104 can be connected to the Internet 102 over a POTS telephone connection 105 to the user's local exchange carrier (LEC) network 106 through a modem (not shown). From the LEC 106, connection is made to a user-local Internet access provider 107, which provides access to the Internet over T1 digital transmission facilities 108. Internet access provider 107 can dial a telephone number for establishing a call via LEC 106. Similarly, ISP 101 can dial a telephone number for establishing a call via LEC 117.

Other users may be located within a common corporate (or educational) environment 109, using, for example, terminals 110, 111 and 112, which are connected to a corporate (or educational) data network 113. Corporate (or educational) data network 113 can be a local area network (LAN) or wide area network (WAN), which is connected to a corporate web server 114. Server 114 provides its own information and/or interactive services to users using the terminals within the corporate (or educational) environment 109, while simultaneously being available to other users on the Internet. The corporate web server 114 is connected to the Internet 102 over T1 digital transmission facilities 126 or other digital facilities. The corporate (or educational) users can thus access the information and/or interactive services available on corporate web server 114, or they can access over Internet 102 the information and/or interactive services available through ISP 101, or any other ISP connected to the Internet 102, although not shown in the figure. Corporate web server 114 is also connected to PBX 120, which is connected to LEC network 121 and to telephone set 119 and telephone set 100, which are associated with terminals 110 and terminal 111, respectively. Corporate web server 114 can direct PBX 120 to dial a designated telephone number by means of a signal over line 123.

LEC 106, LEC 117, and LEC 121 are each also connected to an interexchange (IXC) telephone network 115. As known in the art, LEC networks 106, 117, and 121 include switching systems capable of communicating with and routing calls to and from IXC telephone network 115. These switching systems are stored-program control switches which contain the service logic required to intercept calls which require special handling by the IXC network 115, and to send queries to the IXC network 115. IXC network 115 also includes similar switching systems which are involved in communicating with and routing calls to and from LEC networks 106, 117, and 121, and in routing calls over the IXC network 115. Such switching systems are well known and may be, for example, an AT&T 5ESS® switch or an AT&T No. 4 ESS™ switch.

Figure 2:
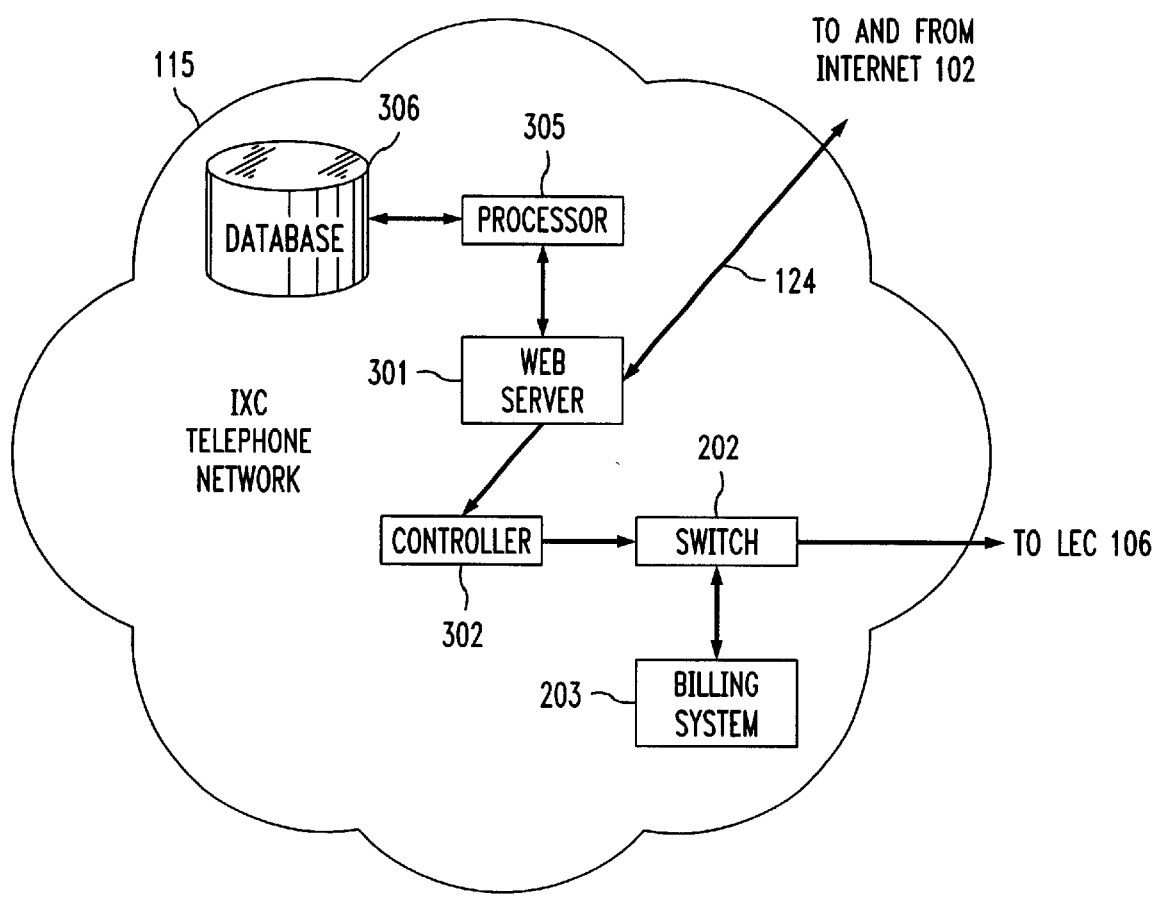
FIG. 2 illustrates functional components of an interexchange telephone network over which the telephone connection for secure communication is established in accordance with the present invention.

IXC network 115 may also be connected to Internet 102 over digital transmission facilities 124. FIG. 2 illustrates functional components of IXC network 115. Switch 202 is coupled to LEC 106. As is well known, many of such switches are networked to provide communication of calls over the IXC network, and for purposes of clarity of exposition, switches networked to switch 202 and coupled to LECs 117 and 121 are not shown in FIG. 2. A billing system 203 is associated with switch 202 to bill for calls routed over IXC network 115. In addition, web server 301 can direct a controller 302 to place a call through the switch 202.

As previously discussed, charging for the information and/or interactive services that can be provided to a user from an ISP, such as ISP 101, can present a problem if the user has not established a financial billing relationship with the ISP. Establishing such a relationship, or alternatively arranging payment by credit card over the Internet is likely to impose an impediment to a user who desires to access ISP 101. Generally, because of the lack of an acceptable, secure payment mechanism, many ISPs today do not charge for access to their information and/or interactive services, even though a substantial benefit is provided to their users. Thus, the establishment of a simple, secure payment mechanism can be of substantial financial value to an ISP who may receive hundreds, if not thousands, of requests for information and/or interactive services each day. Furthermore, charging the user a fair fee for access to information and/or interactive services that users consider of value will not likely hinder the user from accessing the ISP that may have previously provided free access. Moreover, many smaller ISPs which previously requested credit card information for accessing their services, may experience increased requests and concomitant payment for their informnation because users will not be disinclined to send credit card information for payment. The increased demand may encourage further entry of new SPs into the market, and thus may reduce user/consumer costs by increasing competition.

In accordance with the present invention, communication of credit card or other sensitive information (including electronically deliverable goods/services) between a user and an ISP on the Internet (or other data network) is effected by a separate telephone call connection (i.e., over the public switched telephone network) established between the user's Internet access provider and the ISP. The establishment of the telephone connection is initiated in response to actions of the user. For instance, the user may explicitly request a secure communication link or the user may request a page from the ISP that involves credit card or sensitive information. Alternatively, the user may send credit card or other payment information to the ISP to purchase electronically-deliverable goods/services from the ISP but may choose to forego an option of requesting a secure communication link for sending the credit card or payment information to the ISP; nevertheless, in response to this payment, the terminating ISP may choose to complete the transaction (i.e., by sending the electronically-deliverable good/services to the user) over a secure communication link. The Internet's access provider or the terminating ISP may first recognize that the user's actions require establishing the separate telephone connection. In any event, the telephone connection may be established according to the user's originating Internet access SP calling the terminating ISP, resulting in the telephone connection charges being incurred by the originating Internet access SP and passed along to the user according to the normal established billing arrangement. Alternatively, the telephone connection may be established according to the terminating SP calling the originating SP, resulting in the telephone connection charges being incurred by the terminating SP (unless charges are "reversed" by, for example, using a special access number), who may account for such costs in charges to users. After the telephone connection is established, it is used for communicating the sensitive information, after which the telephone connection is terminated.

Figure 3:
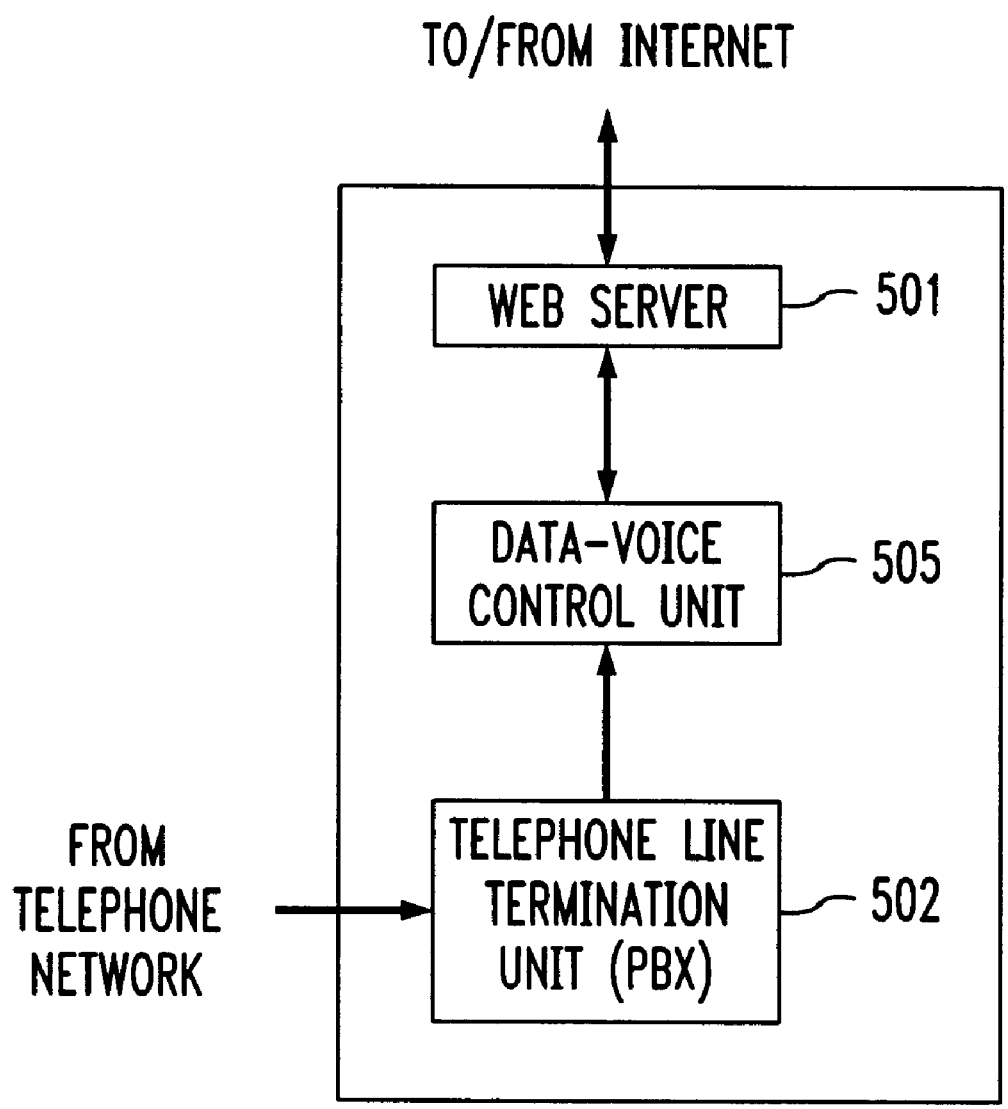
FIG. 3 is a functional block diagram representation applicable to both ISP 101 and Internet Access Provider 107 showing the relationship between the elements that interact with the Internet and those that interact with the telephone network.

As may be appreciated from the foregoing, in accordance with practicing the present invention, ISP 101 must be capable of receiving and/or transmitting telephone calls via LEC 117, and of associating such telephone calls with user's logged onto ISP 101 over the Internet 102. Similarly, Internet Access provider 107 must be capable of receiving and/or transmitting telephone calls via LEC 106, and of associating such telephone calls with user's logged onto Internet 102 via telephone connections to Internet Access Provider 107. FIG. 3 is a functional block diagram representation applicable to both ISP 101 and Internet Access Provider 107 showing the relationship between the elements that interact with the Internet and those that interact with the telephone network. These elements include a web server 501 for providing information and/or interactive services on the Internet and a telephone line termination unit 502, such as a PBX to terminate calls being placed between ISP 101 and Internet Access Provider 107, calls from users to the Internet Access Provider 107, and other calls to or from ISP 101 (e.g., credit card number verification calls) or Internet Access Provider 107. A control unit 503 serves as the interface between the web server 501 and unit 502 for comparing and associating information provided over the telephone network with data received from the Internet, as well as for directing termination unit 502 to place calls in response to direction of web server 501. Control unit 503 may be embodied as a server or processor including, or separate from, web server 501, and which includes and controls a modem bank that is coupled to termination unit 502. Accordingly, control unit 503 is cooperative with web server 501 to associate a user with a given telephone line.

Figure 4:
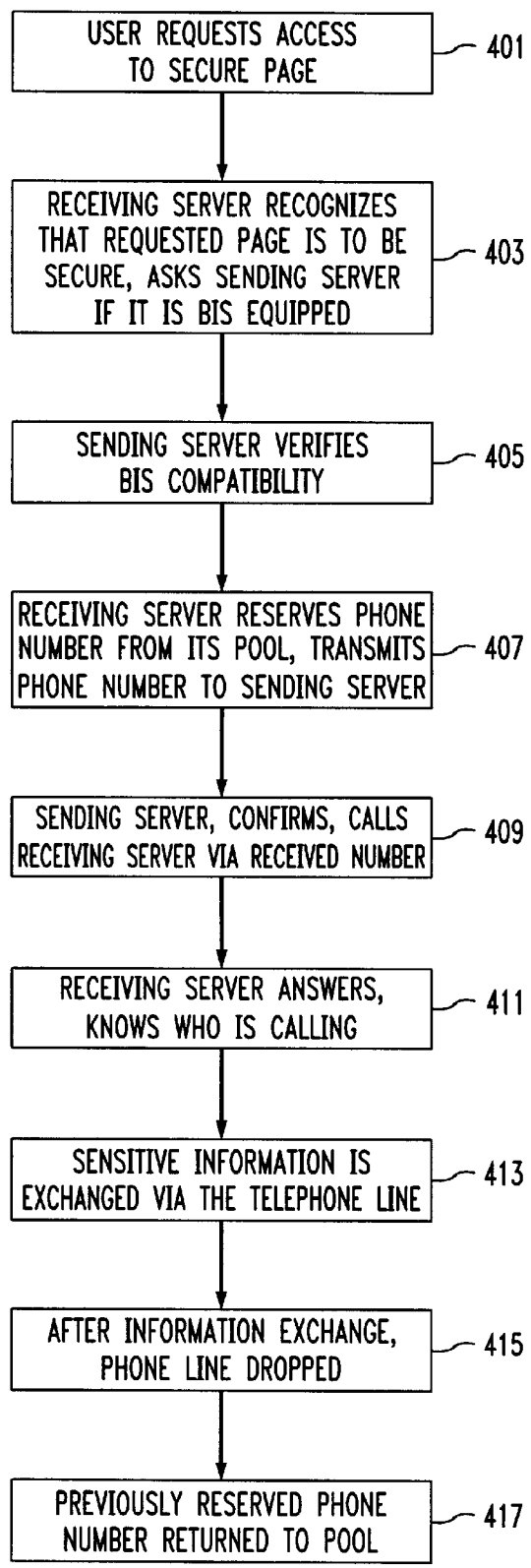
FIG. 4 is a flowchart illustrating a payment mechanism according to the data network security method and system of the present invention in which a secure telephone connection is established by initiation of ISP in recognition of certain actions by the user.

FIG. 4 is a flowchart illustrating a payment mechanism according to the data network security method and system of the present invention (for convenience, referred to hereinbelow as DNS) in which a secure telephone connection is established by initiation of ISP 101 in recognition of certain actions by the user at terminal 104.

Actions by the user at terminal 104 implicitly or explicitly result in a request for access to a secure page for communication of credit card information to ISP 101. (step 401). For instance, a user browsing the web may encounter the web site associated with ISP 101 which may require payment for searching any information it contains (i.e., for accessing the web site). Immediately upon this encounter, ISP 101 queries the user whether the user wishes to proceed with the search of the web site by paying a specified access charge. If the user responds affirmatively, the user has implicitly requested a secure page since the ISP 101 recognizes that the secure page is needed for communicating credit card payment information. Alternatively, ISP 101 may allow the user to search the web site information for free, but may require payment for any, or certain, information that the user wishes to download. Then, upon the user's confirmed request for downloading specified information (e.g., documents, files, etc.), the user has implicitly requested a secure page since the ISP 101 recognizes that a secure page must be provided for payment.

Alternatively, web pages provided by ISP 101 may include a DNS icon such that when the user invokes (i.e., clicks on) the icon, the ISP 101 is sent a message which explicitly requests that the current web page on terminal 104 be sent by the DNS (i.e., that the web page be considered a secure page). Similarly, although the user may have an option for invoking DNS in order to purchase electronically-deliverable goods/services, the user may send credit card or payment information to ISP 101 by a conventional mechanism (e.g., over the Internet). From the user's actions of paying for electronically-deliverable goods/services, ISP 101 recognizes that a secure communication link should be established to complete the transaction by delivering the electronically-deliverable goods/services in a manner that protects their value to ISP 101.

Based on these explicit and/or implicit requests according to the user's actions and associated conditions, ISP 101 recognizes that a secure communication link must be established for the secure page and thus, initiates a protocol for establishing a telephone connection by querying Internet access provider 107 via Internet 102 as to whether Internet access provider 107 supports DNS (step 403).

If Internet access provider confirms that it supports DNS, ISP 101 assigns a phone number from its modem pool and transmits this phone number via Internet 102 to Internet access provider 107 (steps 405–407). Internet access provider 107 confirms receipt of the phone number, and calls ISP 101 via the received phone number (step 409). ISP 101 responds to this phone call, thereby establishing the telephone connection for secure communication of sensitive information (step 411). Notably, since ISP 101 assigned the phone number for a particular user, ISP 101 knows that the phone call received at the pre-assigned number is for the particular user. Where each phone number of ISP 101 is not rigidly assigned to a particular modem, ISP 101 can compare the dialed number, as received by ISP 101 according to the Dialed Number Identification Service (DNIS) of the telephone company, to identify and associate the received telephone call with a particular user identified over the Internet by a particular Internet network address. The term "network address" as used herein means the mechanism for identifying the user and could be the Internet protocol address or any other mechanism for identifying the user on the Internet or on any other network. For those situations in which the DNIS may not be available, and there is no rigid assignment of phone numbers with modems, ISP 101 supplies Internet access provider 107 with an identification number over the Internet which is transmitted by Internet access provider 107 via the established telephone connection to ISP 101. ISP 101 can then identify the telephone call with the particular user. Alternatively, Internet access provider 107 can send user identification information already known to ISP 101 (e.g., Internet network address) over the telephone connection, without having received some identification number/information from ISP 101. Thus, in any event, ISP 101 knows that any information received on the established phone connection is for the particular user, and similarly, that sensitive information to be sent to the particular user should be sent on the particular established phone connection. It is noted, that even where ISP 101 can identify a received telephone call as associated with a particular user independently of any information sent over the phone connection, it still may be advantageous for a user identification to be sent over the phone connection in order to confirm that the phone connection is associated with the particular user.

It is understood that rather than having Internet access provider 107 call ISP 101, ISP 101 could call Internet access provider 107 at a number provided to ISP 101 in conjunction with confirming DNS support. However, it is preferable that Internet access provider 107 place the call to a phone number provided by ISP 101 in order to thwart an eavesdropper who intercepts the phone number information and, if the phone number were transmitted from Internet access provider 107 to ISP 101, could rapidly place a phone call to the Internet access provider 107 before ISP 101 places the call, and pretend to be ISP 101, thereby receiving the credit card or sensitive information from Internet access provider 101. Further, it is more convenient for Internet access provider 107 to place the call so that the associated telephone charges can be easily billed to the user.

More generally, preferably the server that will first send credit card or other sensitive or valuable information should not provide the phone number to the other server which would place a call to that phone number, in order to avoid such disguised interception by an eavesdropper who need not provide any payment or other sensitive or valuable information to the called server before receiving payment or other sensitive or valuable information from the called server (even if a protocol required the calling party to provide some confirmation or identification information to the called party, the eavesdropper likely will have intercepted or accessed this confirmation or identification information).

By this mechanism, for a bi-directional transaction (e.g., payment for electronically deliverable goods/services), Internet access provider 107 could provide the phone number for ISP 101 to call if ISP 101 agrees to send its information first. Then, if an eavesdropper intercepted the phone number and placed the call to Internet access provider 107, the eavesdropper could not receive the payment or other sensitive or valuable information from Internet access provider since the eavesdropper must first provide such information, which the eavesdropper does not have, to Internet access provider 107.

Of course, it necessarily follows that if there will be only unidirectional transfer of payment or other sensitive or valuable information over the telephone connection, then preferably the server that will send credit card or other sensitive or valuable information should not provide the phone number to the other server which would place a call to that phone number for reception of the call by the server that will send the payment or other sensitive or valuable information.

If the telephone connection is successfully established, credit card or other sensitive information is communicated over the secure telephone connection (step 413). This communication may involve sensitive information communication from the user to ISP 101 and/or sensitive information communication from ISP 101 to the user (e.g., electronically deliverable goods/services). Prior to delivering electronically deliverable goods/services or authorizing delivery of non-electronically deliverable goods, terminating ISP 101 preferably verifies the credit card information by placing a separate telephone call to credit card verification facilities.

Preferably, when sensitive information is to be transmitted from the user to ISP 101, ISP 101 first sends a confirmation to the user indicating whether DNS is active. For instance, it may not be possible to establish the DNS secure telephone connection because DNS is not supported by Internet access provider 107, or because ISP 101 does not receive a call within predetermined period of time, etc. This confirmation allows the user to decide whether to send the user's sensitive information to ISP based on whether DNS is active. For instance, if DNS were inactive, the user would decide whether to send the credit card info by conventional encrypted communications over the Internet 102, or to abort payment. ISP 101 may preempt this option if electronically deliverable goods/services are to be delivered by ISP 101, since with DNS inactive ISP 101 may not wish to deliver certain valuable goods over the Internet.

Once the sensitive information has been exchanged, the DNS phone connection is terminated and ISP 101 returns the previously reserved phone number to the pool of available phone numbers that can be assigned (steps 415–417). Various mechanisms are possible for terminating the connection. For instance, ISP 101 may drop the phone connection once ISP 101 recognizes that all sensitive information has been communicated and that a subsequent user action does not require further secure communications capability. Alternatively, ISP 101 can communicate to Internet access provider 107 over the Internet the number of secure pages that will be transmitted, and Internet access provider 107 may drop the connection after it has transmitted the specified number of pages between user and ISP 101. Alternatively, Internet access provider 107 may drop the connection once it recognizes from monitoring the secure access field in the TCP/IP protocol of transmitted pages (packets) from the user to ISP 101 that the page (packet) being transmitted from the user to ISP is no longer designated a secure page. Alternatively, the user may be provided with an icon which, when selected, sends a message to ISP 101 or to Internet access provider 107 to terminate the DNS connection such that further communications are over the Internet.

It may be appreciated, therefore, that the present invention provides many features, advantages, and attendant advantages for users and service providers on data networks. From the user's standpoint, a secure payment method is available which frees use for previously offerred but inadvisable transactions, thereby effectively providing the user with not only convenience but also with information, services, and goods previously not easily located or available external to the Internet. From the ISP's standpoint, a method of receiving payment is provided which facilitates increasing the market and demand for the supplied information and/or interactive services, and/or non-electronic goods or services. In addition, the secure communication method should result in increased use and development of the Internet, as well as reduced cost to the user.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope.

For instance, it is understood that the operational flows shown in FIG. 4 are merely illustrative, and the steps shown and described are not all essential for practicing the invention and are not limiting of additional or alternative steps that may be included for practicing various embodiments of the invention. For example, for additional security it may be desired to encrypt the credit card information that is transferred over the telephone connection. Also, as discussed above, it may be appreciated that an ISP may rely on the DNS mechanism for enhanced security to transfer electronically deliverable goods to a user who has purchased the goods, regardless of whether the DNS mechanism is used (e.g., because of on user choice, or unavailability of DNS to the user) to convey the user's credit card information to the ISP.

In addition, although the present invention has been described hereinabove primarily in connection with the payment for information and/or interactive services of the type generally available to a user on the Internet or other data network, the present invention could readily be applied to the provision to the user of any type of information and/or services to a user on a first connection over a network of any type, with billing being effected for that information and/or services on a second connection through the telephone network. Thus, the present invention could could also be used for teleconferencing services, video services, TV services provided by cable and/or broadcast mediums, and interactive services such as games, bulletin boards and chat mediums. It is to be understood that the term "information and/or interactive services" is to include all of these types of information and services, and all other types not specifically mentioned. The network over which the information and/or interactive services can be provided can be a wired or wireless data network, or a wired or wireless analog network. The signals transmitted on the wired network can be electrical or optical in nature. Also, while the hereinabove embodiment has been described with reference to a telephone call being placed over an IXC network, the telephone call may be established within an LEC without special handling by IXC, where the ISP and Internet access provider are connected to the same LEC.

These and other changes can be made without departing from the spirit and the scope of the invention and without diminishing its attendant advantages. It is therefore intended that the present invention is not limited to the disclosed embodiments but should be defined in accordance with the claims which follow.

I claim:

1. A method for communicating information, both ways between an originating server and a terminating server, where the originating server and the terminating server are connected over a data network by a first two-way communications connection that includes at least one switching or routing active node, said method comprising the steps of:

establishing, while said first two-way communications connection continues to be active, a separate connection between said originating server and said terminating server, said separate connection being established through a network that is distinct from the network of said first two-way communications connection; and transmitting at least some of said information via the separate connection.

2. The method according to claim 1, wherein said separate connection is a switched circuit telephone connection.

3. The method according to claim 1, further comprising the step of terminating said separate connection after said step of transmitting said information is performed.

4. The method according to claim 1, further comprising a step wherein said information is communicated, both ways, between said originating server and a user terminal that is connected to the originating server via a telecommunication connection, thereby communicating the information between said user terminal and said terminating server.

5. The method according to claim 4, wherein said step of transmitting said information includes said user terminal transmitting payment information to said terminating server.

6. The method according to claim 4, wherein said step of transmitting said information includes said terminating server transmitting electronic information to said user as recompense for payment information received from said user terminal via said telecommunication connection or said separate connection.

7. The method according to claim 1 where said data network is a packet network.

8. The method according to claim 4, wherein said step of establishing a separate connection is invoked in response to actions at the user terminal.

9. The method according to claim 1, wherein said terminating server initiates the step of establishing the separate connection.

10. The method according to claim 1, wherein said first two-way communications link aims to form a point-to-point connection between said orioinating server and said terminating server.

11. The method according to claim 1, wherein said step of establishing the separate connection includes the steps of:
said terminating server providing a telephone number to said originating server over the first two-way communications link;
said originating server placing a call using said telephone number; and
said terminating server receiving said call and thereby establishing said separate connection.

12. The method according to claim 11, further comprising before the step of said terminating server providing a telephone number, the step of said originating server transmitting to said terminating server information indicative of desire to establish the separate connection.

13. The method according to claim 1, wherein said step of establishing the separate connection includes the steps of:
said originating server providing a telephone number to said terminating server over the first communications link on the data network;
said terminating server placing a call using said telephone number; and
said originating server receiving said call.

14. The method according to claim 13, further comprising before the step of said originating server providing a telephone number, the step of said terminating server transmitting to said originating server information indicative of intent to establish said separate connection.

15. A method for communicating information between a user and a terminating server, said user connected to said terminating server via an accessing server which is connected to said terminating server over a data network by a first communications link, said method comprising the steps of:

at the terminating server:
associating a telephone call with said user;
establishing, in coordination with said accessing server, a telephone connection with said accessing server;
communicating said information with said accessing server via said telephone connection while said first communication link connection continues to be active;
at the accessing server:
establishing, in coordination with said terminating server, said telephone connection;
associating said telephone connection with said user;
communicating said information with said terminating server via said telephone connection; and
communicating said information with said user.

16. The method according to claim 15, wherein said step of establishing a telephone connection includes the steps of:
said terminating server providing a telephone number to said accessing server over the first communications link on the data network;
said accessing server placing a call using said telephone number; and
said terminating server receiving said call.

17. The method according to claim 16, further comprising before the step of said terminating server providing a telephone number, the step of said accessing server transmitting to said terminating server information indicative of establishing the separate connection.

18. The method according to claim 15, wherein said step of establishing the separate connection includes the steps of:
said accessing server providing a telephone number to said terminating server over the first communications link on the data network;
said terminating server placing a call using said telephone number; and
said accessing server receiving said call.

19. The method according to claim 13, further comprising before the step of said origination server providing a telephone number, the step of said terminating server transmitting to said originating server information indicative of establishing the separate connection.

20. A system for secure communication, comprising:
an originating server;
a terminating server connected to said originating server over a packet data network by a first two-way communications link that includes at least one switching or routing active node and which carries information from said originating server to said terminating server and from said terminating server to said originating server;
a dialer for establishing a secure connection between said originating server and said terminating server that is distinct from the first two-way communications link; and
means for transmitting at least some of said information via the secure connection while said first two-way communications link is active.

21. The system according to claim 20, wherein said secure connection is a switched circuit telephone connection.

22. The system according to claim 20, wherein said secure connection is over a network separate from said data network.

23. The system according to claim 20, further comprising a user terminal remote from said originating server but connected thereto, for receiving information from said terminating server and for sending information to said terminating server, wherein said information includes payment information communicated to the terminating server from the user terminal.

24. The system according to claim 23, where said payment information is communicated from said originating server to said terminating server via said secure connection.

25. A method for communicating first sensitive information possessed by a first party to a second party, and communicating second sensitive information possessed by the second party to the first party, where said first party is connected to said second party via a first two-way communication link of a data network, where information that is not sensitive flowing from said first party to said second party, and vice versa over said first two-way communication link of said data network by means of data packets, said method comprising the steps of:

transmitting a phone number from said first party to said second party over said first two-way link;

placing a call over a telecommunications network that is distinct from said data network, using said phone number, from said second party to said first party;

receiving said call at said first party to provide a secure telephone connection over said telecommunications network between the first party and the second party; and transmitting said first sensitive information and said second sensitive information over said secure telephone connection.

26. The method according to claim 25 wherein when the first sensitive information is transmitted before transmitting the second sensitive information.

27. The method according to claim 26, where said first sensitive information is payment information and said second sensitive information is an Internet web page.

28. A method for communicating sensitive information from a first internet service provider (ISP) server to a second ISP server, where the first ISP server and the second ISP server are connected to each other by means of a primary connection over a packet network, said method comprising the steps of:

While maintaining said primary connection, establishing a connection between said first ISP server and said second ISP server that is more secure than said primary connection; and transmitting said sensitive information via the more secure connection while said primary connection is active.

29. The method of claim 28 where said more secure connection is effected over a network other than said packet routing network.

30. The method of claim 28 where said more secure connection is effected over a switched-circuit telephone network.

31. The method of claim 28 where said sensitive information is payment information whereby a party associated with said first ISP promises to pay said second ISP.

32. The method of claim 31 where said payment information aims to induce said second ISP server to provide said party with goods, services, or sensitive second-ISP-server information.

33. The method of claim 32 where said sensitive second-ISP-sever information is provided to said party over said more secure connection.

34. The method of claim 33 where said sensitive second-IPS-server information is an Internet web page.

35. In a system where an accessing server is arranged to service a plurality of users as well as to establish a two-way connection to a terminating server over a packet routing data network, and where a user is connected to the accessing server via a telecommunications connection, a method comprising the steps of:

in response to action taken by said user, the accessing server initiating the establishment of a secure connection between the accessing server and the terminating server by exchanging a telephone number with the terminating server;

the accessing server participating with the terminating server in the establishment of said secure connection based on the exchanged telephone number and associating said secure connection with said user;

the accessing server participating in the exchange of information over said secure connection between said user and said terminating server; and the accessing server participating in the dismantling of said secure connection upon completion of said exchange of information.

36. The method of claim 23 where said information, in addition to including payment information, includes sensitive information possessed by said terminating server for which said payment information is a recompense.

\* \* \* \* \*